Feb. 13, 1945. R. R. CURTIS 2,369,440
SELF-LUBRICATED AND COOLED PUMP AND MOTOR ASSEMBLY
Filed June 12, 1943 2 Sheets-Sheet 1
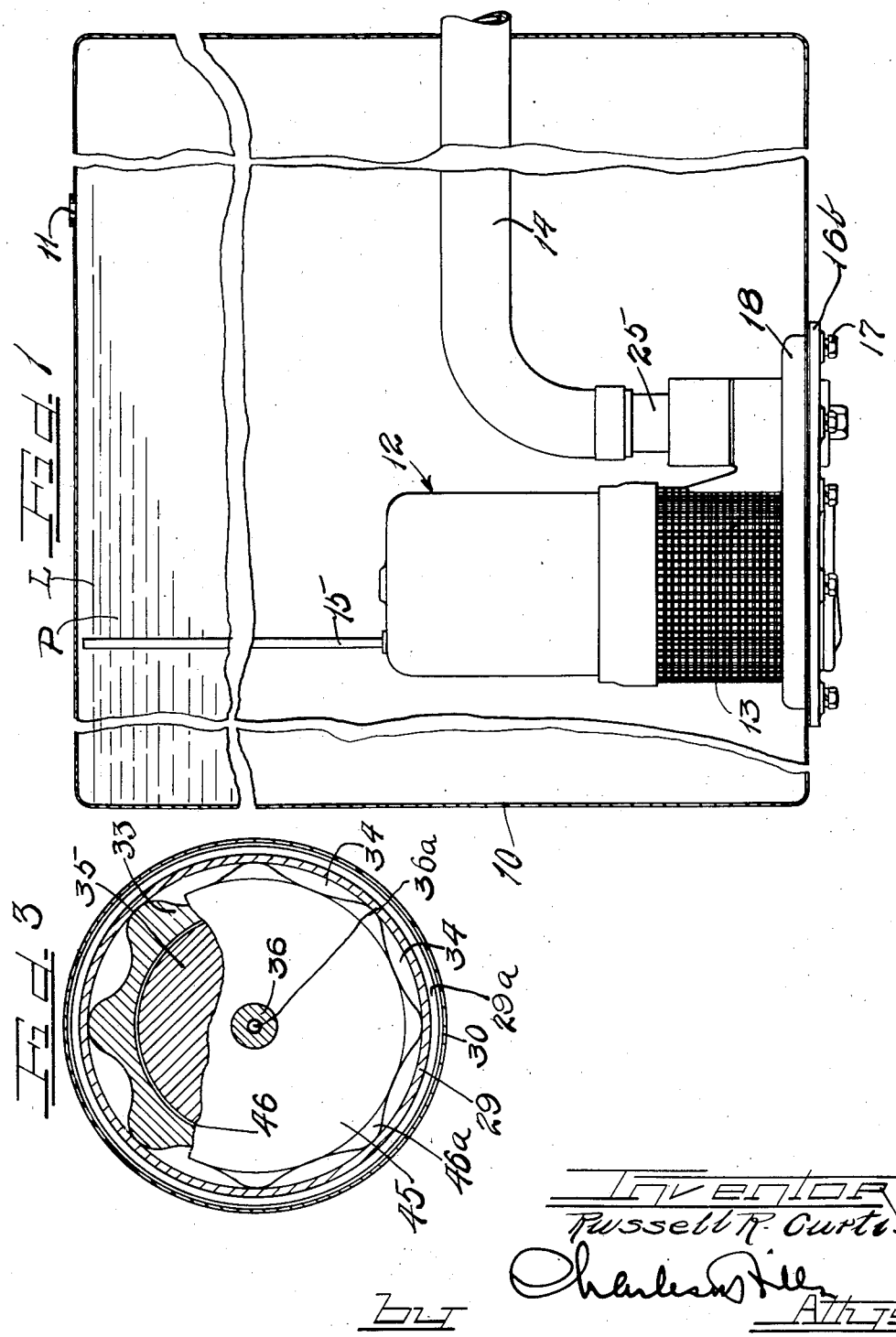

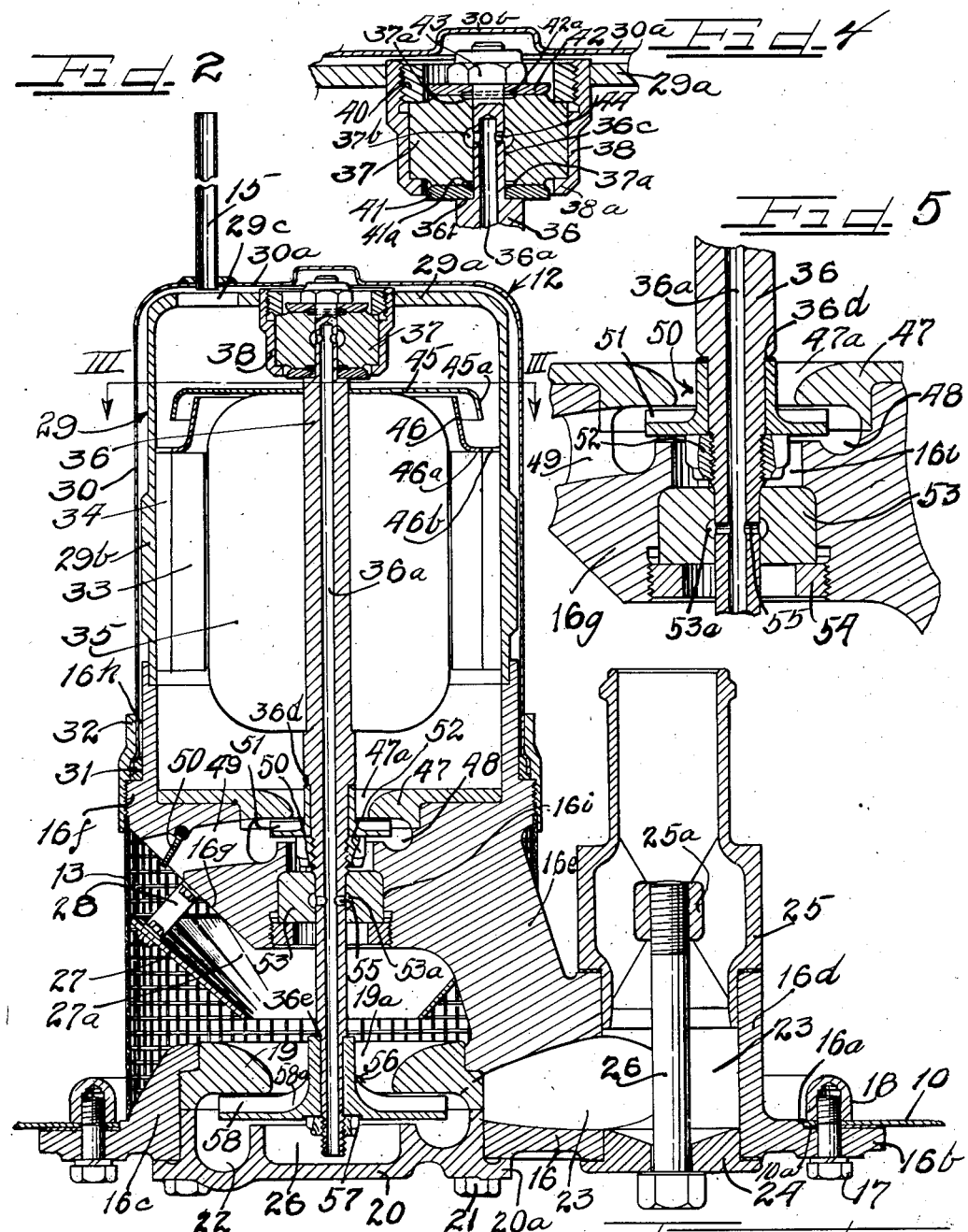

Patented Feb. 13, 1945

2,369,440

UNITED STATES PATENT OFFICE 2,369,440.

SELF-LUBRICATED AND COOLED PUMP AND MOTOR ASSEMBLY

Russell R. Curtis, Dayton, Ohio, assignor to Curtis Pump Company, Dayton, Ohio, a corporation of Ohio Application June 12, 1943, Serial No. 490,582

12 Claims. (Cl. 103—87)

This invention relates to pump and motor assemblies wherein fluids pressured by the pump are utilized to lubricate bearings of the assembly and simultaneously cool the motor of the assembly.

Specifically, the invention relates to an electric motor-centrifugal booster pump unit adapted to be submerged in a fuel tank for directly pressuring fuel from the tank into a fuel line while simultaneously separating bubbles of gas and vapor from the fuel and flowing some of the pressured fuel over bearing surfaces of the unit as well as around the motor of the unit to lubricate the bearings and cool the motor.

The invention will hereinafter be specifically described as embodied in an electric motor-centrifugal type submerged booster pump unit for aircraft fuel systems, but it should be understood that the principles of this invention are widely applicable to many other constructions and therefore the scope of the invention is not limited to the specifically described and illustrated unit.

In accordance with this invention an electric motor of either the brush or brushless type has the rotor thereof mounted on a hollow shaft which is rotatably carried in plain bearings such as compressed graphitic carbon rings. A pair of pump impellers is mounted on this hollow shaft in spaced superimposed relation. A main pumping chamber is provided around the lower impeller and this chamber discharges into a pipe line or the like. The entire unit of this invention is adapted to be submerged in a tank and the inlet of the main pumping chamber communicates directly with the interior of the tank. A smaller pumping chamber surrounds the upper impeller and this chamber discharges to the interior of the tank. The inlet of the smaller pumping chamber communicates with the interior of a casing in which the motor is mounted. The hollow drive shaft is open at its lower end and communicates with the main pumping chamber to receive pressured fluids therefrom which are caused to flow upwardly through the shaft. The shaft has radial vent ports along the portions thereof passing through the plain bearings and some of the fluid bleeds out through these vents to lubricate the bearings. Most of the fluid is discharged into the motor casing above the motor therein and flows around the motor to the inlet of the smaller pumping chamber whereupon the smaller impeller circulates the fluid back to the tank.

An important feature of the invention is the elimination of heretofore necessary shaft seals between the motors and pumps.

Another feature of the invention is the provision of a cooling system for motors in motor-pump assemblies utilizing material being pumped by the assembly as a coolant without creating a high frictional drag on the motor.

A still further feature of the invention is the provision of an extremely simple and highly efficient lubricating system for plain bearings utilizing liquids being pumped as the lubricating media.

Another feature of the invention is the provision of an electric motor driven pump unit with a motor casing adapted to be completely submerged in inflammable liquid such as gasoline, which unit maintains a rich liquid atmosphere in the motor casing without offering resistance to operation of the motor to prevent ingress of oxygen to the motor and thereby eliminating explosion hazards.

It is, then, an object of the invention to provide a pump construction including a pump shaft and bearing assembly wherein fluids being pumped are flowed through the shaft to lubricate the bearing.

Another object of the invention is to provide a self-lubricating pump assembly.

A still further object of the invention is to provide a self-cooling motor and pump unit.

A still further object of the invention is to provide a submerged type electric motor driven booster pump for fuel systems wherein the motor is not subjected to the frictional drag of the fuel surrounding it and at the same time is prevented from causing explosions by the maintenance of a fuel-rich atmosphere therearound free from gases and vapors capable of causing explosions.

A still further object of the invention is to provide a fuel pump and motor unit wherein the motor is cooled by gas and vapor-freed fuel from the pump.

A still further object of the invention is to circulate fluid from a pump around a motor driving the pump in such a manner as to eliminate frictional drag on the motor.

A specific object of the invention is to provide a pump and motor unit including a main impeller driven by the motor for pressuring fluids into a discharge line and a secondary impeller also driven by the motor for maintaining circulation of fluids around the motor.

Another object of the invention is to provide a pump and motor unit that does not require seals between the pump and motor.

Other and further objects of the invention will be apparent to those skilled in the art from the following detailed description of the annexed sheets of drawings which, by way of preferred example only, illustrate one embodiment of the invention.

On the drawings:

Figure 1 is a broken vertical cross-sectional view of a fuel tank having a submerged booster pump and motor unit according to this invention mounted therein and shown in elevation.

Figure 2 is an axial cross-sectional view of the booster pump and motor unit shown in Figure 1.

Figure 3 is a transverse cross-sectional view taken along the line III—III of Figure 2.

Figure 4 is an enlarged fragmentary vertical cross-sectional view of the upper bearing assembly for the booster pump unit shown in Figure 2.

Figure 5 is an enlarged fragmentary vertical cross-sectional view of the lower bearing and upper pump of the unit shown in Figure 2.

As shown on the drawings:

In Figure 1 the reference numeral 10 designates a gasoline tank for an airplane having a vent opening 11 in the top wall thereof and containing a pond P of gasoline reaching a level L near the top of the tank when the tank is filled.

A booster pump and motor unit 12 is mounted in the tank 10 on the bottom wall thereof and receives gasoline from the pond P through a screen 13 to pressure the same into a fuel line 14 extending into the tank. The fuel line 14, as is customary in aircraft fuel systems, supplies an aircraft engine-driven fuel pump. A vent tube 15 extends from the top of the unit 12 to terminate at a level above the top level L of the pond P.

As best shown in Figure 2, the unit 12 has a base 16 with a pilot portion 16a therearound extending into an opening 10a in the bottom wall of the tank 10. A mounting flange 16b is provided around the base 16 to underlie the tank 10 and to receive bolts such as 17 therethrough. The bolts 17 project through the bottom wall of the tank 10 around the opening 10a thereof and are threaded into a mounting ring 18 disposed on the bottom wall of the tank 10 around the opening 10a thereof. The unit 10 is thus clamped to the bottom wall of the tank 10 and extends into the tank to be submerged in the pond of fuel P therein as shown in Figure 1.

The base 16 has a thickened open ended annular portion 16c, an upstanding tubular portion 16d also open at the ends thereof, and an upstanding leg or pedestal 16e between the portions 16c and 16d.

A throat ring 19 is seated in the cylindrical chamber provided by the thickened portion 16c and defines an inlet 19a communicating with the interior of the cylindrical screen 13. A cap 20 projects into the lower portion of the chamber provided by the thickened portion 16c into abutting relation with the throat ring 19. This cap 20 has an outturned flange 20a receiving bolts 21 therethrough securing the cap to the base 16. These bolts 21 are accessible from the exterior of the tank 10, so that the cap 20 can be removed without dismounting the unit 12 from the tank.

The throat ring 19 and the cap 20 cooperate to define a pump volute chamber 22 adapted to receive fuel from the inlet 19a of the throat ring and discharge this fuel into a passageway 23 provided through the thickened portion 16c and the pedestal portion 16e to communicate with a chamber 23 provided by the upstanding tubular cylindrical portion 16d. The open bottom of the cylindrical chamber 23 is adapted to be closed by an end cap 24 and the open top of this chamber is adapted to receive a fitting 25 which is connected to the discharge line 14 as shown in Figure 1. A bolt 26 extends through the end cap 24 into threaded engagement with a spider-carried boss 25a of the fitting 25. If it is desired to discharge the fuel to an outside pipe line instead of the inside pipe line 14, the positions of the fitting 25 and cap 24 can be reversed.

The end cap 20 has a central well portion 26 in communication around the open top thereof with the volute chamber 22 for a purpose to be more fully hereinafter described.

The upper end of the pedestal 16e carries an integral externally threaded circular portion 16f with a converging conical bottom 16g in spaced relation above the inlet 19a of the throat ring 19. A conical guide shield 27 is suspended by means of brackets 28 from this conical portion 16g in spaced relation from the conical portion to define a localized converging path 27a adapted to receive fuel around the open top thereof and direct this fuel to the inlet 19a. The bottom of the shield is in spaced relation above the inlet 19a to provide, between the throat ring and the bottom of the shield, an annular open space through which bubbles of gas and vapor can be laterally ejected for rising along the outer face of the shield 27 and back through the screen 13 to the interior of the tank.

The circular portion 16f has an upstanding cylindrical flange 16h receiving and supporting a cup-shaped casing 29 for a motor unit. A cup-shaped cover 30 surrounds the motor casing 29 and has its bottom open end seated on a resilient gasket or sealing ring 31 which is bottomed on the top of the externally threaded circular portion 16f. A ring 32 surrounds the mouth of the cup 30 and can be integral with the cup or separate from the cup, as desired. This ring 32 projects beyond the cup 30 and its projecting end is threaded onto the circular portion 16f to seal the mouth of the cup 30 relative to the portion 16f. The ring 32 extends beyond the threaded portion 16f to overlie the top of the screen 13 and hold the screen in position. The bottom of the screen is seated on the base 16 against an upstanding shoulder on the base.

The cup casing 30 receives the lower end of the vent tube 15 through the top closed wall 30a thereof.

The field coil or stator 33 of an electric motor such as, for example, an induction motor is carried in the motor casing 29 in spaced relation beneath the closed top 29a thereof and the outer wall of this stator 33 cooperates with the inner cylindrical wall of the cup 29 to provide a plurality of open-ended vertical passageways 34 as shown in Figure 3.

An armature or rotor 35 of the electric motor is disposed within the stator 33 and is supported in spaced relation from the ends of the motor casing 29 on a hollow shaft 36 with a vertical passageway 36a extending through the open bottom of the shaft and terminating just beneath the closed top of the shaft.

The shaft 36 is rotatably carried at its upper end in a plain bearing such as a graphitic carbon ring 37 which is mounted in a sleeve 38 pressed into the upper wall 29a of the casing 29 as best shown in Figure 4. This sleeve 38 has an inturned flange 38a around the bottom thereof supporting the bearing 37 and has an internally threaded open top receiving a hollow plug 40 in threaded relation therewith for clamping the ring 37 in the sleeve against the flange 38a.

The shaft 36 has a shoulder 36b near the top thereof receiving a thrust washer 41 thereon which acts on the bottom of the plain bearing 37. A reduced-diameter portion 36c of the shaft 36 extends through the bearing 37 and terminates in an externally threaded end projecting above the bearing into a recess provided by a raised localized portion 30b on the top wall 30a of the casing 30. A thrust washer 42 is mounted on top of the bearing 37 and a nut 43 is threaded onto the threaded end of the shaft for suspending the shaft through the thrust washer 42 from the top of the bearing 37.

The thrust washers 41 and 42 preferably have recesses 41a and 42a in their thrust faces around the apertures therethrough cooperating with recesses 37a in the end faces of the bearing 37 to provide pockets for a purpose to be hereinafter described. The bearing 37, in addition, has an annular recess 37b around the bore therethrough intermediate the ends of the bearing, and the reduced portion 36c of the shaft has radial ports 44 connecting the passageway 36a with this annular recess 37b.

A spinner plate 45, as shown in Figure 2, is disposed around the shaft 36 on top of the rotor 35 and has a depending skirt portion 45a enveloping a collar member 46 supported on the stator 33. This collar 46 has an outturned flange portion 46a resting on top of the stator and provided with apertures 46b therearound aligned with the passages 34.

A throat ring 47 is mounted on top of the portion 16f within the flange 16h and provides an inlet 47a to another pump volute chamber 48 provided in the portion 16g. This pump volute chamber 48 discharges through a passageway 49 into the space within the screen 13 above the guide cone 27. A flap valve 50 can be pivotally suspended to prevent back flow of fluid from the interior of the screen into the volute 48 and thereby prevent the motor casing from filling with fuel when the unit is submerged in the pond P.

The shaft 36 has another shoulder 36d adjacent the inlet 47a of the throat ring and an impeller 50 has the hub portion thereof bottomed on this shoulder 36d together with upstanding radially extending vanes 51 underlying the throat ring 47 for centrifugally discharging fluid into the volute 48. A nut 52 is threaded on the shaft 36 to hold the impeller 50 against the shoulder 36d.

The portion 16g has a stepped bore 16i therethrough, as best shown in Figure 5, receiving the nut 52 freely therein. A second plain bearing 53 is also seated in the bore 16i and bottomed against a step thereof. A threaded ring 54 is threaded into the lower end of the bore 16i against the bearing 53 to hold the same against the step in the bore 16i. This bearing 53 receives the shaft 36 therethrough and has an annular recess 53a intermediate the ends thereof aligned with ports 55 in the shaft to be in communication with the passageway 36a of the shaft.

A third shoulder 36e (Figure 2) is also provided on the shaft 36 near the bottom end thereof and this bottom end of the shaft receives the hub of another impeller 56 thereon. The impeller hub is bottomed on the shoulder 36e by a nut 57 which is threaded onto the lower end of the shaft. The impeller 56 has upstanding vanes 58 underlying the throat ring 19 to pump fluids from the inlet 19a into the volute chamber 22 together with other vane portions 58a in free communication with the inlet 19a to serve as agitators for beating out bubbles of gas and vapor from the fluid before the fluid becomes trapped in the pump.

As shown in Figure 2, the motor casing 29 has a thickened portion 29b surrounding the stator 33 for a purpose to be better hereinafter described. As also shown in Figure 2, the top wall 29a of the motor casing has an aperture 29c therethrough aligned with the open bottom end of the vent tube 15.

In operation of the pump herein described, gasoline from the pond P flows through the screen 13 into the top of the guide cone 27 and out of the bottom open end of the guide cone into the pump inlet 19a. The agitating vanes 58a of the impeller 56 act on this fluid flowing through the inlet 19a and beat out bubbles of gas and vapor from the fluid ejecting these bubbles back through the inlet 19a in an outwardly flaring path to rise along the outside of the guide cone back through the screen 13. The bubbles will thereupon rise through the pond P to the surface L of the pond and will burst at the surface discharging their gases and vapors to the atmosphere through the vent opening 11 of the tank 10. The bubble-freed liquid is acted on by the pumping vanes 58 and is pressured into the volute 22 and also into the well 26 of the cup member 20. Most of the pressured liquid flows through the discharge passageway 23 and into the fuel line 14. However, some of the pressured liquid will flow from the well 26 upwardly through the passageway 36a of the shaft 36. Some of this liquid in the passageway 36a will bleed out of the ports 55 into the recess 53a of the bottom bearing 53 to flow along the bearing walls of this bearing thereby lubricating the same. The rest of the liquid flows to the top of the shaft 36 where it will bleed out of the ports 44 into the recess 37b of the top bearing 37. From this recess the liquid will flow along the bearing surface to the pockets or recesses provided by the recessed faces 37a of the bearing 37 and the recesses 41a and 42a of the thrust washers 41 and 42. From these pockets the gasoline will flow over the thrust bearing faces of the bearing and will drain out onto the spinner plate 45 which rotates with the rotor 35. This plate will centrifugally discharge the fluid to permit it to drain through the passages 34 around the stator 33. After the fluid is drained through the bottoms of the passages 34, it is deposited on the throat ring 47 and flows through the inlet 47a provided by the throat ring to be acted on by the impeller 50. The pumping vanes 51 of this impeller will discharge the fluid through the volute 48 into the passage 49 and back to the interior of the tank.

The interior of the motor casing 29 can never be subjected to excessive pressures since it is vented to the top of the tank through the tube 15 and the tank, in turn, is vented to the atmosphere through the vent opening 11. Any vapors which might be formed in the motor casing 29 can, of course, escape through the vent tube 15.

The construction of this invention does not require any seal between the motor and the main pump since the material being pumped is not only utilized to lubricate the bearings for the motor, but it also utilized to cool the motor. The liquid pumped through the motor shaft 36 and flowed around the stator of the motor acts as a coolant for the motor. The thickened portion 29b of the motor casing is capable of absorbing heat and, since this portion is in direct communication with the passageways 34, it will be kept cool by the fluid and thereby keeps the motor in a cool running condition.

It will also be noted that the rotor 35 of the motor is not operating in a pond or pool of fluid and hence is not subjected to frictional drag since the fluid is directed by the plate or spinner 45 to pass through passageways around the stator. The plate 45 and its cooperating collar 46 prevents the fluid from flowing between the rotor 35 and stator 33. The vent tube 15, by being in communication with the atmosphere through the vent 11 in the tank 10, prevents reduced pressures from being formed in the motor casing 29 that might otherwise be formed when fuel is scavenged from the motor compartment by the impeller 50.

The fluid which lubricates the lower bearing 53 passes either back to the interior of the guide cone 27 or into the volute chamber 48 from which it is pumped back to the interior of the tank.

This invention, as will be understood from the above descriptions, provides for the submerging of a motor and pump unit in a pond of liquid to pump liquids from the pond and to utilize some of the liquid being pumped for lubricating the bearings of the unit, for cooling the motor of the unit, for eliminating the necessity of seals between the pump and motor, and for preventing the liquids from interfering with free operation of the motor.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In combination with a tank adapted to contain a pond of liquid, a combined motor and pump unit in said tank adapted to be submerged in said pond of liquid, said unit including a pump having an inlet communicating with the interior of the tank and an outlet for discharging pressured liquids received through said inlet, a casing for said motor of the unit defining a motor chamber, said motor of the unit including a stator and a rotor in said motor chamber, said unit having top and bottom bearings rotatably supporting said rotor, means for circulating pressured liquid from said pump through said bottom bearing, means for circulating pressured fluid from said pump through said top bearing and thence into the top of said motor chamber from said top bearing for downward flow in said chamber, said liquid being effective to lubricate the bearings and cool the motor, and said motor chamber having a bottom outlet communicating with the interior of the tank for said liquid.

2. In combination with a fuel tank, a combined electric motor and centrifugal booster pump unit mounted on the bottom wall of said tank and extending into the tank to be submerged in fuel contained in the tank, said unit having a pump inlet communicating with the interior of the tank near the bottom thereof for receiving fuel therefrom, said unit including a pumping chamber communicating with said inlet and an impeller for pressuring fuel from the inlet into the pumping chamber, said motor of the unit including a hollow shaft carrying said impeller, bearings in said unit rotatably supporting said shaft, the interior of said shaft communicating with said pumping chamber to receive pressured fuel therefrom, and said shaft having ports adjacent said bearings to discharge fuel from the interior of the shaft on the bearings to lubricate the bearing surfaces.

3. In combination with a tank adapted to contain a pond of liquid, a combined electric motor and pump unit in said tank adapted to be submerged in liquid contained in the tank, said unit including a first pump communicating with the interior of the tank, an electric motor having a drive shaft for driving said first pump, a casing surrounding the motor providing a motor chamber, a second pump driven by said shaft communicating with said motor chamber and having a discharge outlet communicating with the interior of said tank, and means for circulating pressured liquid from the first pump into said motor chamber for flowing therethrough into said second pump and thence back to the tank.

4. In combination with a liquid reservoir, an electric pump and motor unit mounted in said reservoir having a motor casing isolating the motor thereof from the liquid in the reservoir, a first pump having an inlet communicating with the interior of the reservoir to pressure liquid from the reservoir, a second pump communicating with the interior of the motor casing, and means for circulating liquid from the first pump to the second pump for flowing through the motor casing, said second pump discharging back to the interior of the tank.

5. A pump and motor unit comprising means defining a motor chamber, a drive shaft extending from said motor chamber, a pump impeller driven by said drive shaft, a pumping chamber receiving fluid from said impeller, means for circulating some fluid from the pumping chamber through said drive shaft, bearings rotatably supporting said drive shaft, and ports for bleeding fluid from the drive shaft into the bearings to lubricate the bearings.

6. A pump and motor unit comprising means defining a motor casing, an electric motor stator mounted in said casing, an electric motor rotor in said casing having operating clearance with said stator, a shaft extending through the rotor, plain bearings supporting said shaft, a pump impeller secured on said shaft, a pumping chamber coacting with said impeller, said shaft being hollow and communicating with said pumping chamber, ports in said shaft connecting the interior thereof with the bearings, means on said rotor receiving fluid from a bearing to fling the fluids away from said rotor, said stator cooperating with said casing to define passages receiving fluid therethrough, and means for propelling fluids from said passageways out of said casing.

7. In an electric motor and pump assembly including a rotor-driven drive shaft and a pump impeller driven by said drive shaft, the improvement of means defining a pumping chamber communicating with said drive shaft, and said drive shaft having a passageway therethrough for receiving pressured fluids from said pumping chamber to convey the fluids away from said chamber.

8. A pump and motor unit comprising a housing providing a pumping chamber and a motor chamber, bearings supported by said housing, a motor shaft rotatably mounted in said bearings, a pump impeller on said shaft for flowing fluids from said pump chamber through said bearings and into said motor chamber, and a second impeller on said shaft communicating with said motor chamber for removing fluids therefrom.

9. In a motor and pump unit for attachment to a tank wall to be submerged in liquids contained by the tank, a member having a base portion with an attachment flange around the periphery thereof and an annular thickened portion adapted to project into a tank when the attachment flange is mounted on a tank wall, a post portion extending from said base portion, a motor support portion on said post portion aligned with the thickened portion, a motor casing on said motor support portion, a motor stator mounted in said casing, a motor rotor within said stator in said casing, a motor shaft projecting through said rotor, bearings receiving said motor shaft therethrough, means in the thickened portion of said member providing a pumping chamber, an impeller on said shaft cooperating with said pumping chamber, means connecting said pumping chamber with said bearings to lubricate the bearings with fluid from the pumping chamber, a spinner mounted on said rotor in said motor casing positioned to receive fluid from a bearing, means in said casing directing fluid from said spinner around said stator, and means for removing fluid from said casing.

10. A pump and motor unit comprising a hollow vertical drive shaft, an electric motor rotor surrounding said drive shaft, an electric motor stator surrounding said rotor, a casing defining a motor chamber for said rotor and stator, a plain bearing carried by the top wall of said casing rotatably supporting said drive shaft, pumping means communicating with the bottom of said motor chamber, and means for flowing fluid through said drive shaft and bearing for circulation through said motor chamber to said pumping means.

11. A pump unit comprising a hollow shaft, a pump impeller driven by said shaft pressuring fluid into the shaft, and a bearing carrying said shaft having a bearing surface communicating with the interior of the shaft to receive fluid therefrom.

12. A pump unit comprising a bearing having a thrust face, a shaft acting on said thrust face, pumping means on said shaft, and means for flowing fluid pressured by said pumping means through said shaft to flow along the thrust face of the bearing.

RUSSELL R. CURTIS.